(12) United States Patent
Nakamura (10) Patent No.: US 10,847,847 B2
(45) Date of Patent: Nov. 24, 2020

(54) POWER SOURCE APPARATUS, DISTRIBUTED POWER SOURCE SYSTEM, AND CONTROL METHOD THEREOF

(71) Applicant: KYOCERA CORPORATION, Kyoto (JP)

(72) Inventor: Kazutaka Nakamura, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 315 days.

(21) Appl. No.: 15/764,823

(22) PCT Filed: Sep. 29, 2016

(86) PCT No.: PCT/JP2016/004403
§ 371 (c)(1),
(2) Date: Mar. 29, 2018

(87) PCT Pub. No.: WO2017/056502
PCT Pub. Date: Apr. 6, 2017

(65) Prior Publication Data
US 2018/0323630 A1 Nov. 8, 2018

(30) Foreign Application Priority Data
Sep. 29, 2015 (JP) .................. 2015-192266

(51) Int. Cl.
*H01M 10/44* (2006.01)
*H01M 10/48* (2006.01)
(Continued)

(52) U.S. Cl.
CPC ........... *H01M 10/44* (2013.01); *H01M 10/48* (2013.01); *H02J 3/38* (2013.01); *H02J 7/00* (2013.01);
(Continued)

(58) Field of Classification Search
CPC .... H02J 7/0065; H02J 7/34; H02J 2007/0067; H01M 10/44; H01M 10/48
See application file for complete search history.

(56) References Cited

U.S. PATENT DOCUMENTS 9,627,907 B2   4/2017  Ohashi et al.
9,929,570 B2   3/2018  Ishibashi et al.
(Continued)

FOREIGN PATENT DOCUMENTS

JP   2009-044862 A   2/2009
JP   2013-102572 A   5/2013
(Continued)

OTHER PUBLICATIONS

International Search Report dated Dec. 20, 2016, issued by Japan Patent Office for International Application No. PCT/JP2016/004403.

(Continued)

*Primary Examiner* — Daniel Kessie
(74) *Attorney, Agent, or Firm* — Procopio Cory Hargreaves and Savitch LLP (57) ABSTRACT

A power source apparatus has a load following function. The power source apparatus includes a distributed power source configured to output electric power and a controller configured to control the electric power output of the distributed power source. The controller is configured to acquire an evaluation function including an operation history of the power source apparatus and set an output condition for the power source apparatus on the basis of the evaluation function and a response characteristic for load following. The controller is also configured to control the load following to supply electric power from the distributed power source on the basis of the output condition upon forward power flow or reverse power flow being detected by a detector configured to detect forward power flow and (Continued)

reverse power flow relative to a power grid to which the power source apparatus is connected.

4 Claims, 7 Drawing Sheets

(51) Int. Cl.
    *H02J 7/34*     (2006.01)
    *H02J 3/38*     (2006.01)
    *H02J 7/00*     (2006.01)

(52) U.S. Cl.
    CPC ......... *H02J 7/34* (2013.01); *H02J 2007/0067* (2013.01); *H02J 2207/20* (2020.01)

(56) References Cited

U.S. PATENT DOCUMENTS

| | | |
|---|---|---|
| 10,211,635 B2 | 2/2019 | Nakayama |
| 2011/0077792 A1 | 3/2011 | Shimoda et al. |
| 2013/0113437 A1 | 5/2013 | Ishibashi et al. |
| 2014/0152097 A1* | 6/2014 | Kitaji ........................ H02J 1/10 307/19 |
| 2014/0163762 A1* | 6/2014 | Nakamura ................ H02J 3/32 700/295 |
| 2014/0265585 A1* | 9/2014 | Della Sera ................ H02J 3/38 307/52 |
| 2015/0002102 A1 | 1/2015 | Dhashi et al. |
| 2016/0064936 A1* | 3/2016 | Satake ....................... H02J 7/35 307/20 |
| 2017/0012428 A1 | 1/2017 | Nakayama |

FOREIGN PATENT DOCUMENTS

| | | |
|---|---|---|
| JP | 2013-192327 A1 | 9/2013 |
| JP | 2015-050897 A | 3/2015 |
| WO | 2014/171154 A1 | 10/2014 |
| WO | 2015/111410 A1 | 7/2015 |

OTHER PUBLICATIONS

Written Opinion and Concise Explanation dated Dec. 20, 2016, issued by Japan Patent Office for International Application No. PCT/JP2016/004403.

\* cited by examiner

| Time [10 ms] | 0 | 1 | 2 | 3 | 4 | 5 | 6 | 7 | 8 | 9 | 10 | 11 |
|---|---|---|---|---|---|---|---|---|---|---|---|---|
| Load70 [W] | | | | | | 800 | | | | | | |
| Electricity storage apparatus 20 | Current detection (CT10) | | 500 W UP | | Current detection (CT10) | | 200 W DOWN | | Current detection (CT10) | | 200 W UP | |
| Electricity storage apparatus 21 | | Current detection (CT11) | | 500 W UP | | Current detection (CT11) | | 200 W DOWN | | Current detection (CT11) | | 200 W UP |
| Total output [W] | 0 | 0 | 500 | 1000 | 1000 | 1000 | 800 | 600 | 600 | 600 | 800 | 1000 |

FIG. 6

| Time [10 ms] | 0 | 1 | 2 | 3 | 4 | 5 | 6 | 7 | 8 | 9 | 10 | 11 |
|---|---|---|---|---|---|---|---|---|---|---|---|---|
| Load70 [W] | | | | | | 800 | | | | | | |
| Electricity storage apparatus20 | Current detection (CT10) | | 100 W UP | | | | | | | | | |
| Electricity storage apparatus21 | | Current detection (CT11) | | 100 W UP | | | | ... | | | | |
| Total output [W] | 600 | 600 | 700 | 800 | 800 | 800 | 800 | | | | | |

POWER SOURCE APPARATUS, DISTRIBUTED POWER SOURCE SYSTEM, AND CONTROL METHOD THEREOF

CROSS-REFERENCE TO RELATED APPLICATION

The present application claims priority to and the benefit of Japanese Patent Application No. 2015-192266 filed Sep. 29, 2015, the entire contents of which are incorporated herein by reference.

TECHNICAL FIELD

The present disclosure relates to a power source apparatus, a distributed power source system, and a control method thereof.

BACKGROUND

In order to improve the stability of output from electricity storage apparatuses, demand has recently increased for the installation of a plurality of power source apparatuses, such as fuel cell apparatuses and electricity storage apparatuses, in a consumer facility or the like. In the electricity storage system disclosed in patent literature (PTL) 1, a control apparatus monitors the state of charge (SOC) and the number of discharges of the storage cell in each electricity storage apparatus. The control apparatus in the electricity storage system disclosed in PTL 1 also decides the priority of usable storage cells in accordance with the state of each storage cell and performs control to discharge the storage cells in order from the storage cell with the highest priority.

CITATION LIST

Patent Literature

PTL 1: JP 2013-192327 A

SUMMARY

A power source apparatus according to an embodiment of the present disclosure has a load following function. The power source apparatus includes a distributed power source configured to output electric power and a controller configured to control the electric power output of the distributed power source. The controller is configured to acquire an evaluation function including an operation history of the distributed power source and set an output condition for the distributed power source on the basis of the evaluation function and a response characteristic for load following. The controller is also configured to control the load following to supply electric power from the distributed power source on the basis of the output condition upon forward power flow or reverse power flow being detected by a detector configured to detect forward power flow and reverse power flow relative to a power grid to which the distributed power source is connected.

A distributed power source system according to an embodiment of the present disclosure comprises a plurality of power source apparatuses having a load following function and a detector configured to detect forward power flow from a power grid and reverse power flow to the power grid. The plurality of power source apparatuses comprise a plurality of distributed power sources configured to output electric power and a plurality of controllers configured to control respectively the electric power output of the plurality of distributed power sources. The plurality of controllers are configured to acquire an evaluation function including an operation history of the plurality of distributed power sources and set an output condition for each distributed power source among the plurality of distributed power sources on the basis of the evaluation function and a response characteristic for load following. The plurality of controllers are also configured to control the load following to supply electric power from the plurality of distributed power sources on the basis of the output condition upon forward power flow or reverse power flow being detected by the detector.

A control method for a distributed power source system according to an embodiment of the present disclosure comprises a step A of acquiring an evaluation function including an operation history of a plurality of distributed power sources that have a load following function. The control method for a distributed system also comprises a step B of setting an output condition for each distributed power source among the plurality of distributed power sources on the basis of the evaluation function and a response characteristic for the load following. The control method for a distributed power source system also comprises a step C of detecting a value of forward power flow or reverse power flow with a detector configured to detect forward power flow from a power grid and reverse power flow to the power grid. The control method for a distributed power source system also comprises a step D of controlling the load following on the basis of the output condition upon forward power flow or reverse power flow being detected in step C. The control method for a distributed power source system also comprises a step E of supplying electric power from the plurality of distributed power sources on the basis of control in step D.

DETAILED DESCRIPTION

Depending on the contract between a consumer facility and an electric power provider, the power from an electricity storage apparatus, a fuel cell apparatus, or the like that is not using renewable energy may be prohibited from flowing in reverse to the power grid (i.e. to the electric power provider). In this case, when a power source system that includes a plurality of power source apparatuses, such as electricity storage apparatuses and fuel cell apparatuses, causes the power source apparatuses to operate in parallel, a load following operation to control the amount of electric power in accordance with the power consumption of a load is performed to prevent reverse power flow from each power source apparatus to the power grid. According to this load following operation, forward power flow from the power grid to the consumer facility is continuously controlled.

In a power source system including a plurality of power source apparatuses, the degrees of degradation of the power source apparatuses are preferably balanced. Unfortunately, causing a plurality of power source apparatuses to operate in parallel in a power source system that adopts a load following operation tends to prioritize output of electric power from a power source apparatus with a high load following capability, due to factors such as manufacturing variation. Furthermore, for example when the control timing differs among power source apparatuses, a power source apparatus that starts to perform control early may end up outputting electric power on a priority basis. Such a power source apparatus that outputs electric power on a priority basis runs the risk of early degradation.

In the present embodiment, the power source apparatuses are described as being electricity storage apparatuses. However, the present disclosure can also be applied to other power source apparatuses that perform a load following operation. For example, the power source apparatuses may also be fuel cell apparatuses.

First Embodiment

[System Configuration]

Figure 1:
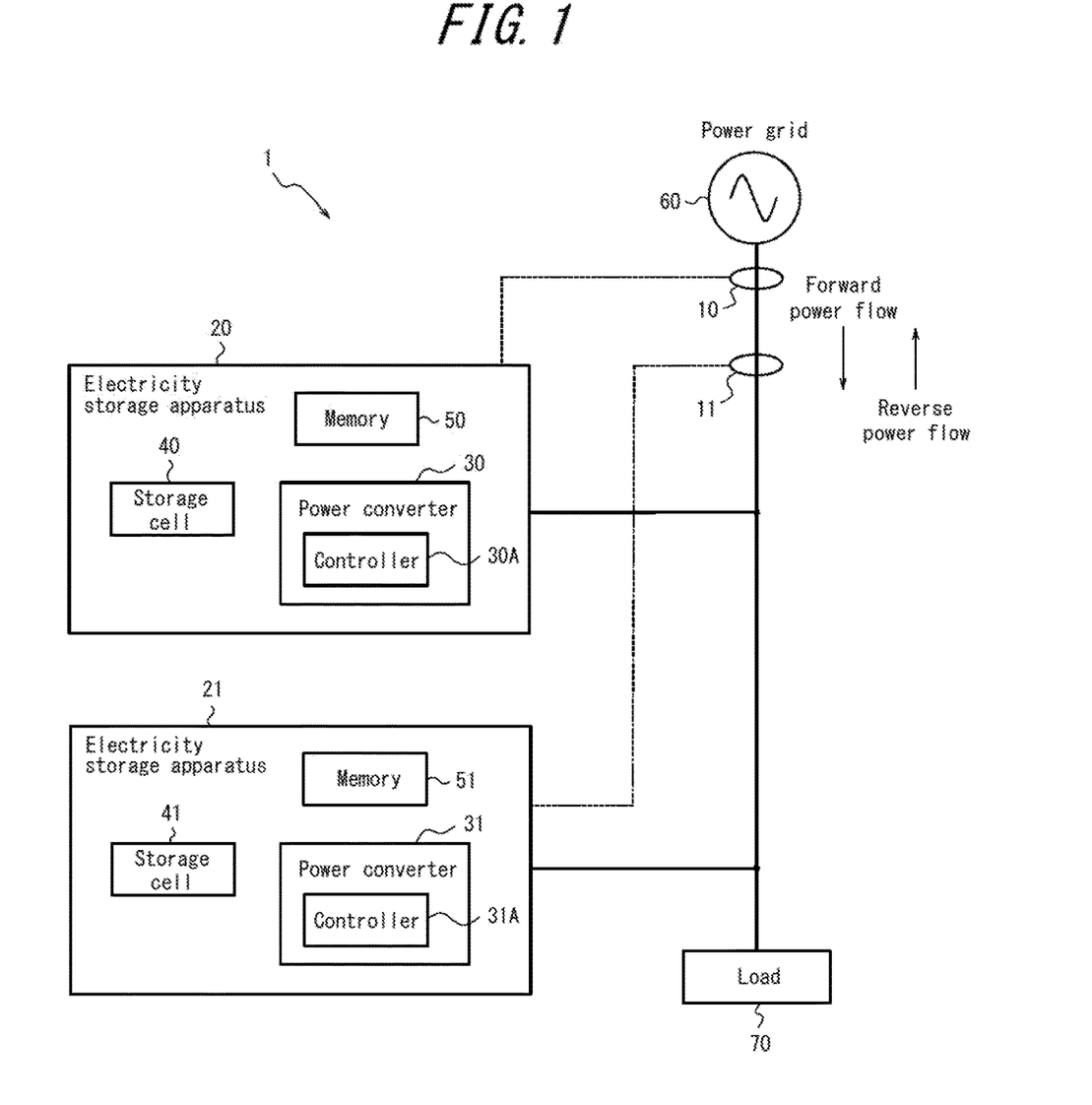
FIG. 1 illustrates an example of the configuration of an electricity storage system according to a first embodiment of the present disclosure.

As illustrated in FIG. 1, the electricity storage system (distributed power source system) 1 according to the first embodiment of the present disclosure includes current sensors (detectors) 10, 11 and electricity storage apparatuses (power source apparatuses) 20, 21. The electricity storage system 1 is used while connected to a power grid 60 and supplies electric power to a load 70. The load 70, which is an electrical device, for example, consumes the electric power supplied by the power grid 60 and the electricity storage system 1. In FIG. 1, the electricity storage system 1 is illustrated as including two electricity storage apparatuses 20, 21, but the number of electricity storage apparatuses in the electricity storage system 1 may be three or more. The solid lines connecting functional blocks in FIG. 1 indicate power lines. The dashed lines in FIG. 1 indicate control lines and signal lines. The connections indicated by the control lines and signal lines may be wired connections or wireless connections.

Current sensors 10, 11 are both connected at positions for detecting the same forward power flow and reverse power flow current values from the power grid 60. In the example in FIG. 1, the current sensors 10, 11 are both connected between the power grid 60 and the electricity storage apparatus 20. The current sensors 10, 11 detect the value of forward power flow from the power grid 60 or of reverse power flow to the power grid 60 and transmit the detected value to the respective electricity storage apparatuses 20, 21.

FIG. 1 illustrates an example in which two current sensors 10, 11 are provided between the power grid 60 and the electricity storage apparatus 20, but the number of current sensors provided between the power grid 60 and the electricity storage apparatus 20 may be one. When only one current sensor is provided between the power grid 60 and the electricity storage apparatus 20, the current sensor transmits the detected values to the electricity storage apparatuses 20, 21.

The electricity storage apparatuses 20, 21, which are connected to the power grid 60, supply electric power to the load 70. The electricity storage apparatus 20 includes a power converter 30, a storage cell (distributed power source) 40, and a memory 50. The electricity storage apparatus 21 includes a power converter 31, a storage cell (distributed power source) 41, and a memory 51.

The power converters 30, 31 respectively control charging and discharging of the storage cells 40, 41. When discharging the storage cells 40, 41, the power converters 30, 31 respectively convert the direct current (DC) power discharged by the storage cells 40, 41 to alternating current (AC) power and supply the AC power to the load 70. When charging the storage cells 40, 41, the power converters 30, 31 respectively convert AC power supplied by the power grid 60 to DC power and supply the DC power to the storage cells 40, 41 to charge the storage cells 40, 41.

The power converters 30, 31 control the discharge power of the respective storage cells 40, 41 on the basis of the values detected by the current sensors 10, 11. Once the forward power flow is detected by the current sensors 10, 11, for example, the power converters 30, 31 cause the respective storage cells 40, 41 to discharge. Once the reverse power flow is detected by the current sensors 10, 11, for example, the power converters 30, 31 perform an operation such as stopping discharge of the respective storage cells 40, 41. This processing is performed by controllers 30A, 31A, which include a processor, provided in the power converters 30, 31. Details of this processing are provided below.

The storage cells 40, 41 respectively supply power to the load 70 by discharging the charged electricity to the power converters 30, 31. The storage cells 40, 41 can respectively charge with electric power supplied by the power grid 60.

The memories 50, 51 respectively store information (the number of discharges of the storage cells 40, 41 and the like) necessary for control by the power converters 30, 31 and a program describing the processing for implementing the functions of the power converters 30, 31. The memories 50, 51 also store an evaluation function for the respective electricity storage apparatuses 20, 21. The evaluation function includes the operation history or the like of the electricity storage apparatuses 20, 21, for example.

Details of the functions of the power converters 30, 31 are now provided. As described above, the following processing is executed on the basis of control by the controllers 30A, 31A provided respectively in the power converters 30, 31.

First, the power converters 30, 31 acquire the evaluation functions for the respective electricity storage apparatuses 20, 21 from the respective memories 50, 51. The power converters 30, 31 then set an output condition of the electricity storage apparatuses 20, 21 on the basis of the acquired evaluation functions and a response characteristic for load following. The response characteristic for load following according to the first embodiment is now described. The response characteristic for load following refers to the discharge power of the electricity storage apparatuses 20, 21 when the discharge power is changed to follow the power consumption of the load 70.

The response characteristic for load following according to the first embodiment is set by the power converter according to the first embodiment so that the electric power, $W_B$, in Equation (1) below is discharged from the storage cell of the respective apparatus.

$$W_B = W_S/n \quad \text{Equation (1)}$$

In Equation (1), $W_S$ is the electric power value calculated from the value detected by the current sensor, and n is the total number of electricity storage apparatuses included in the electricity storage system according to the first embodiment. In the electricity storage system according to the first embodiment, $W_B$, which is the discharge power value of the storage cell, is not determined by $W_S$, which is the electric power value based on the value detected by the current sensor (i.e., $W_B$ is not set to satisfy $W_B=W_S$). In the electricity storage system according to the first embodiment, $W_B$ is set to the result of dividing $W_S$ by the total number, n, of electricity storage apparatuses in the electricity storage system according to the first embodiment, as indicated by Equation (1).

The aforementioned Equation (1) is described using the example in FIG. 1. When $W_B$ represents the value of electric power discharged by the power converter 30 from the storage cell 40, $W_S$ becomes a value calculated on the basis of the value detected by the current sensor 10. When $W_B$ represents the value of electric power discharged by the power converter 31 from the storage cell 41, $W_S$ becomes a value calculated on the basis of the electric power value detected by the current sensor 11. In the example in FIG. 1, the number of electricity storage apparatuses 20, 21 included in the electricity storage system 1 is two. Hence, n=2. The response characteristic for load following of the electricity storage apparatuses 20, 21 (i.e. the discharge power of the electricity storage apparatuses 20, 21 when the discharge power is changed to follow the power consumption of the load 70) is thus set evenly for each of the electricity storage apparatuses 20, 21 to half of the power consumption of the load 70.

The variable n indicating the total number of electricity storage apparatuses 20, 21 included in the electricity storage system 1 in the aforementioned Equation (1) may be set when the electricity storage system 1 is installed. The setting n=2 may also be made upon obtaining the total number, two, of electricity storage apparatuses 20, 21 included in the electricity storage system 1 by the power converters 30, 31 outputting instantaneous pulses at fixed intervals to each other and each measuring the number of instantaneous pulses.

If the rated power outputs of the electricity storage apparatuses 20, 21 included in the electricity storage system 1 differ, then division by n, i.e. the total number of electricity storage apparatuses 20, 21, in Equation (1) may be replaced with multiplication by the ratio of the rated power outputs of the electricity storage apparatuses 20, 21. For example, if the rated power output of the electricity storage apparatus 20 is $W_{20}$ and the rated power output of the electricity storage apparatus 21 is $W_{21}$, then division by n in Equation (1) is replaced with multiplication by $(W_{20}/(W_{20}+W_{21}))$ in the electricity storage apparatus 20. In the electricity storage apparatus 21, division by n in Equation (1) is replaced with multiplication by $(W_{21}/(W_{20}+W_{21}))$.

The power converters 30, 31 respectively set an output condition for the respective electricity storage apparatuses 20, 21 on the basis of the response characteristic for the electricity storage apparatuses 20, 21 set by the aforementioned Equation (1) and the evaluation function obtained from the memories 50, 51.

For example, the power converters 30, 31 respectively calculate the operating time from the operation history included in the evaluation function of the respective electricity storage apparatuses 20, 21. The power converters 30, 31 then set the output condition for the electricity storage apparatuses 20, 21 on the basis of the ratio of the operating times of the electricity storage apparatuses 20, 21 and the response characteristic for the electricity storage apparatuses 20, 21 set by the aforementioned Equation (1). For example, when the operating time of the electricity storage apparatus 20 is longer than the operating time of the electricity storage apparatus 21, the power converter 30 sets the output condition so that the electric power output of the electricity storage apparatus 20 is reduced from the value based on the aforementioned Equation (1) by the ratio of the lengths of the operating times. The power converter 31 sets the output condition so that the electric power output of the electricity storage apparatus 21 is increased from the value based on the aforementioned Equation (1) by the ratio of the lengths of the operating times.

For example, the power converter 30 sets the electric power output of the electricity storage apparatus 20 to a value such that the expression "electric power output=$W_B$+ evaluation function(x)" is satisfied. The evaluation function (x) is, for example, represented by Equation (2) below.

$$\text{Evaluation function}(x) = -\Delta \ (x > 1) \quad \quad \text{Equation (2)}$$
$$= +\Delta \ (x < 1)$$

In Equation (2), $\Delta$ is a constant, for example in the range of several percent to ten and several percent of the rated power output of the electricity storage apparatus. Also, x is the quotient when dividing the operating time of the electricity storage apparatus 20 by the operating time of the electricity storage apparatus 21.

Figure 2:
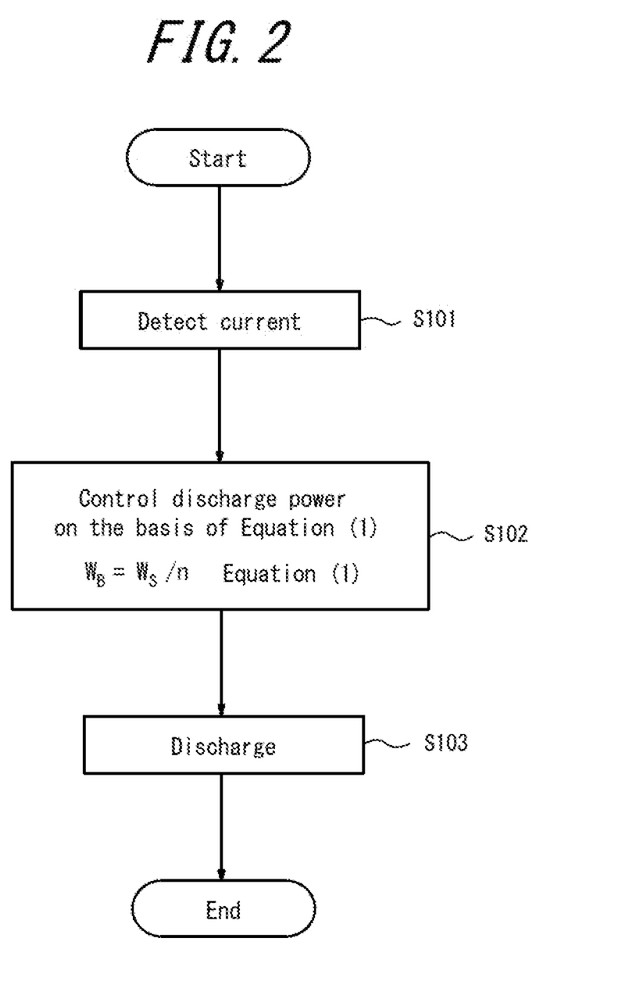
FIG. 2 is a flowchart illustrating an example of operations of the electricity storage system according to the first embodiment of the present disclosure.

Operations of the electricity storage system 1 according to the first embodiment are described below with reference to FIG. 2.

[System Operations]

The evaluation functions of the electricity storage apparatuses 20, 21 are assumed to be equivalent. The power converters 30, 31 operate on the basis of control by the controllers 30A, 31A provided respectively in the power converters 30, 31.

The power consumption of the load 70 increases. The current sensors 10, 11 then detect the forward power flow through the respective sensors (step S101) and transmit the detected value to the electricity storage apparatuses 20, 21.

Next, the power converters 30, 31 perform control so that electric power with the value $W_B$ represented by the aforementioned Equation (1) is discharged from the storage cells 40, 41 (step S102). The storage cells 40, 41 discharge on the basis of control by the power converters 30, 31 (step S103). Half of the power consumption of the load 70 is thereby discharged evenly from each of the storage cells 40, 41.

Figure 3:
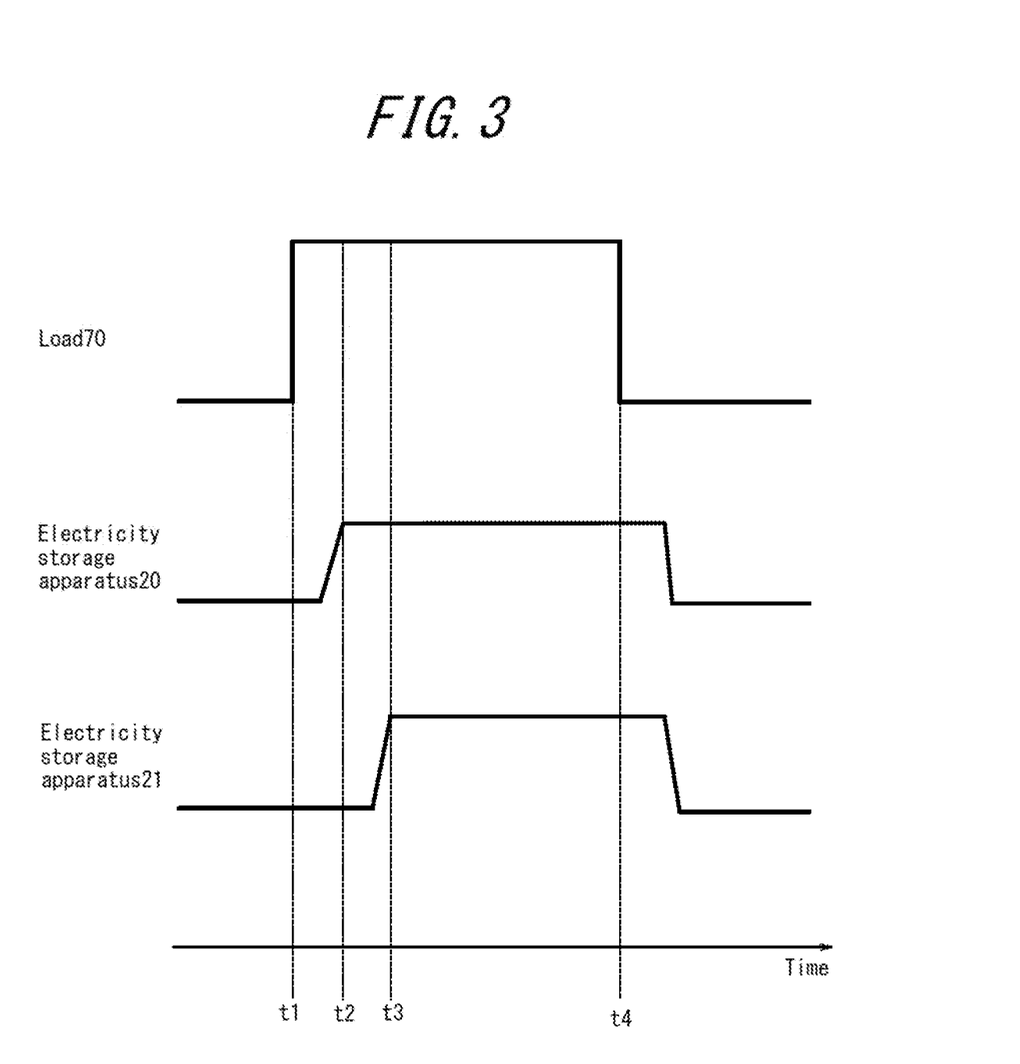
FIG. 3 illustrates an example of waveforms corresponding to power consumption of a load and output from electricity storage apparatuses.

FIG. 3 illustrates an example of waveforms corresponding to power consumption of the load 70 and output from the electricity storage apparatuses 20, 21. The horizontal axis in FIG. 3 indicates time. The vertical axis in FIG. 3 indicates the electric power value. Note that the electricity storage apparatus 20 starts to perform control earlier than the electricity storage apparatus 21 in FIG. 3.

At time t1, the power consumption of the load 70 increases. As a result, at time t2, the electricity storage apparatus 20 outputs half of the power consumption of the load 70 on the basis of the aforementioned Equation (1). Subsequently, at time t3, the electricity storage apparatus 21 outputs half of the power consumption of the load 70 on the basis of the aforementioned Equation (1).

In this way, even when the control timing differs for the electricity storage apparatuses 20, 21, with the electricity storage apparatus 20 starting to perform control earlier than the electricity storage apparatus 21, the electricity storage apparatus 20 does not output a large electric power on a priority basis. Furthermore, the electricity storage apparatuses 20, 21 each evenly output half of the power consumption of the load 70.

The control on the basis of the aforementioned Equation (1) may instead be performed only when the power consumption of the load 70 increases and the output of the electricity storage apparatuses 20, 21 is increased (at times t1, t2 in the example in FIG. 3). In this case, when the power consumption of the load 70 decreases and the output of the electricity storage apparatuses 20, 21 is decreased (time t4 in the example in FIG. 3), the electric power value determined in accordance with the electric power value that is based on the value detected by the current sensors 10, 11 (in the above-described example, $W_B$ satisfying $W_B=W_S$) is caused to be output. With this approach, the load following capability of the electricity storage apparatuses 20, 21 can be increased when the power consumption of the load 70 decreases. Reverse power flow from the electricity storage apparatuses 20, 21 to the power grid 60 caused by a sudden decrease in the power consumption of the load 70 can thus be prevented.

As described above, the electricity storage apparatuses 20, 21 in the electricity storage system 1 according to the first embodiment can each output half of the power consumption of the load 70 evenly through their own control on the basis of the aforementioned Equation (1) and evaluation function, without use of other apparatuses or the like.

Furthermore, with the electricity storage system 1 according to the first embodiment, the degrees of degradation due to charging and discharging in the storage cells 40, 41 can be balanced, thereby improving the reliability of the electricity storage system 1 overall and allowing a stable supply of power.

The electricity storage system 1 according to the first embodiment can also make the output of the electricity storage apparatuses 20, 21 equivalent through control by the electricity storage apparatuses 20, 21 themselves on the basis of the aforementioned Equation (1), even when, for example, the control timing differs between the electricity storage apparatuses 20, 21 (see FIG. 3).

Second Embodiment

[System Configuration]

An electricity storage system according to the second embodiment can adopt the same configuration as the electricity storage system 1 according to the first embodiment. Therefore, the main differences with respect to the first embodiment are described below with reference to FIG. 1.

First, the response characteristic for load following according to the second embodiment is now described. An example in which the load following characteristic is set by the power converter 30 is described below. The following processing is executed on the basis of control by the controller 30A included in the power converter 30.

The power converter 30 controls the discharge power of the storage cell 40 on the basis of the value detected by the current sensor 10. During this control, the power converter 30 first controls the discharge power of the storage cell 40 by determining the electric power value to be discharged from the storage cell 40 (in the above-described example, $W_B$ satisfying $W_B=W_S$) in accordance with the electric power value calculated from the value detected by the current sensor 10.

Subsequently, the power converter 30 determines whether the fluctuation range of the discharge power value of the storage cell 40 is a predetermined value or greater and, moreover, the discharge power value has repeatedly fluctuated a predetermined number of times or more. When the power converter 30 determines that the fluctuation range of the discharge power value of the storage cell 40 is a predetermined value or greater and, moreover, the discharge power value has repeatedly fluctuated a predetermined number of times or more, the power converter 30 decides to reduce the fluctuation amount in the discharge power, which is based on the value detected by the current sensor 10, of the storage cell 40. The power converter 30 repeats the aforementioned control of the discharge power of the storage cell 40.

When the power converter 30 determines that it is not the case that the fluctuation range of the discharge power value of the storage cell 40 is a predetermined value or greater and, moreover, the discharge power value has repeatedly fluctuated a predetermined number of times or more, the power converter 30 determines whether the output from the storage cell 40 is continuously increasing or decreasing. When the power converter determines that the output from the 30 storage cell is continuously increasing or decreasing, the power converter 30 decides to increase the fluctuation amount of the discharge power, which is based on the value detected by the current sensor 10, of the storage cell 40. The power converter 30 repeats the aforementioned control of the discharge power of the storage cell 40.

Operations of the electricity storage system 1 according to the second embodiment are described below with reference to FIG. 4.

[System Operations]

The evaluation functions of the electricity storage apparatuses 20, 21 are assumed to be equivalent. The power converters 30, 31 operate on the basis of control by the controllers 30A, 31A provided respectively in the power converters 30, 31.

The power consumption of the load 70 increases. The current sensors 10, 11 then detect the forward power flow through the respective sensors (step S201) and transmit the detected value to the electricity storage apparatuses 20, 21.

Next, the power converters 30, 31 control the discharge power of the respective storage cells 40, 41 on the basis of the value detected by the current sensors 10, 11 (step S202). The storage cells 40, 41 discharge on the basis of control by the respective power converters 30, 31 (step S203). During the processing in the initially performed step S202, the power converters 30, 31 determine the electric power value to be discharged from the respective storage cells 40, 41 (in the above-described example, $W_B$ satisfying $W_B=W_S$) in accordance with the electric power value calculated from the value detected by the current sensors 10, 11. The power converters 30, 31 thereby control the discharging power of the respective storage cells 40, 41.

Subsequently, the power converters 30, 31 determine whether the fluctuation range of the value of discharged power from the respective storage cells 40, 41 is a predetermined value or greater and, moreover, the discharge power value has repeatedly fluctuated a predetermined number of times or more (step S204). IF When converters 30, 31 determine that the fluctuation range of the discharge power value of the respective storage cells 40, 41 is a predetermined value or greater and, moreover, the discharge power value has repeatedly fluctuated a predetermined number of times or more (step S204: Yes), processing proceeds to step S205. IF power converters 30, 31 determine that it is not the case that the fluctuation range of the discharge power value of the respective storage cells 40, 41 is a predetermined value or greater and, moreover, the discharge power value has repeatedly fluctuated a predetermined number of times or more (step S204: No), processing proceeds to step S206.

Figure 5:
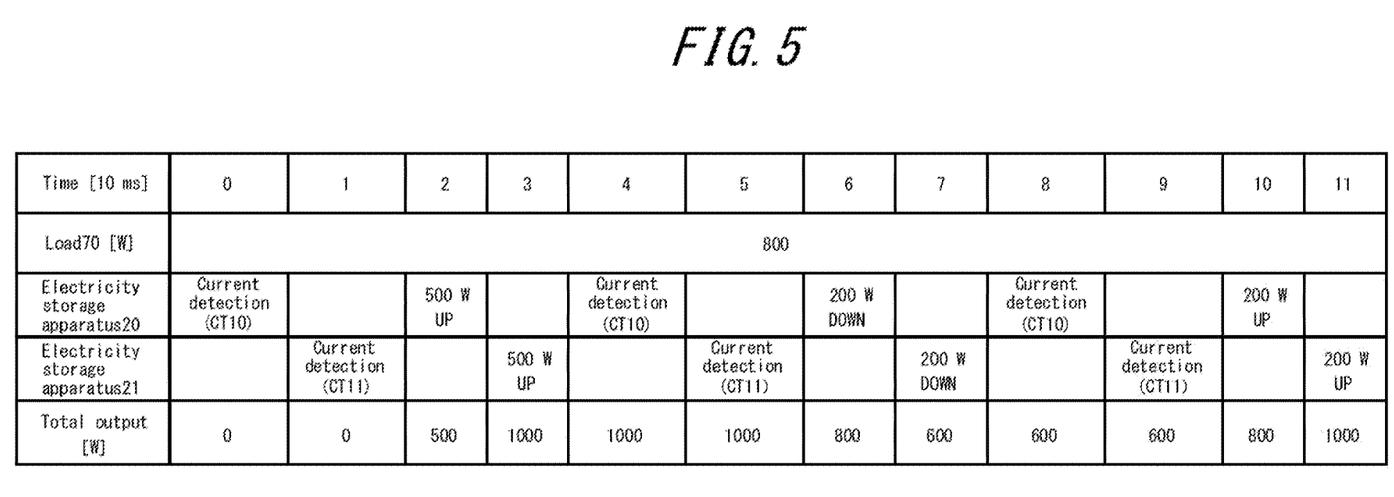
FIG. 5 illustrates an example of a case in which the fluctuation range of the discharge power value is a predetermined value or greater and the discharge power value repeatedly fluctuates.

FIG. 5 illustrates an example of the case where the fluctuation range of the discharge power value is a predetermined value or greater and, moreover, the discharge power value repeatedly fluctuates. The power consumption of the load 70 is 800 W in the example in FIG. 5. The control cycle of the electricity storage apparatuses 20, 21 is 40 ms in the example in FIG. 5. The control cycle of the electricity storage apparatus 20 is 10 ms ahead of the control cycle of the electricity storage apparatus 21. The single maximum discharge power value in one cycle of the electricity storage apparatuses 20, 21 is 500 W in the example in FIG. 5. These conditions are also the same in the FIG. 6, described below.

At time 0 ms, the current sensor 10 transmits the detected value to the electricity storage apparatus 20. The power converter 30 then determines, on the basis of the value detected by the current sensor 10, that the output is 800 W short of the power consumption of the load 70 and decides to cause the maximum discharge power of 500 W to be discharged from the storage cell 40. At time 20 ms, the power converter 30 causes the storage cell 40 to discharge the maximum discharge power of 500 W. As a result, the total output of the electricity storage apparatuses 20, 21 becomes 500 W.

At time 10 ms, the current sensor 11 transmits the detected value to the electricity storage apparatus 21. The power converter 31 then determines, on the basis of the value detected by the current sensor 11, that the output is 800 W short of the power consumption of the load 70 and decides to cause the maximum discharge power of 500 W to be discharged from the storage cell 40. At time 30 ms, the power converter 31 causes the storage cell 41 to discharge the maximum discharge power of 500 W. As a result, the total output of the electricity storage apparatuses 20, 21 becomes 1000 W.

At time 40 ms, the current sensor 10 transmits the detected value to the electricity storage apparatus 20. The power converter 30 then determines, on the basis of the value detected by the current sensor 10, that the output is 200 W over the power consumption of the load 70 and decides to reduce the discharge power value of the storage cell 40 by 200 W. At time 60 ms, the power converter 30 reduces the discharge power value of the storage cell 40 by 200 W and causes the storage cell 40 to discharge 300 W of power. As a result, the total output of the electricity storage apparatuses 20, 21 becomes 800 W.

At time 50 ms, the current sensor 11 transmits the detected value to the electricity storage apparatus 21. The power converter 31 then determines, on the basis of the value detected by the current sensor 11, that the output is 200 W over the power consumption of the load 70 and decides to reduce the discharge power value of the storage cell 41 by 200 W. At time 70 ms, the power converter 31 reduces the discharge power value of the storage cell 41 by 200 W and causes the storage cell 41 to discharge 300 W of power. As a result, the total output of the electricity storage apparatuses 20, 21 becomes 600 W.

At time 80 ms, the current sensor 10 transmits the detected value to the electricity storage apparatus 20. The power converter 30 then determines, on the basis of the value detected by the current sensor 10, that the output is 200 W short of the power consumption of the load 70 and decides to increase the discharge power value of the storage cell 40 by 200 W. At time 100 ms, the power converter 30 increases the discharge power value of the storage cell 40 by 200 W and causes the storage cell 40 to discharge 500 W of power. As a result, the total output of the electricity storage apparatuses 20, 21 becomes 800 W.

At time 90 ms, the current sensor 11 transmits the detected value to the electricity storage apparatus 21. The power converter 31 then determines, on the basis of the value detected by the current sensor 11, that the output is 200 W short of the power consumption of the load 70 and decides to increase the discharge power value of the storage cell 41 by 200 W. At time 110 ms, the power converter 31 increases the discharge power value of the storage cell 41 by 200 W and causes the storage cell 41 to discharge 500 W of power. As a result, the total output of the electricity storage apparatuses 20, 21 becomes-1000 W.

In this manner, from time 20 ms onward in the example in FIG. 5, the discharge power value of the storage cells 40, 41 has a fluctuation range of 200 W or greater, and the discharge power value repeatedly fluctuates. In such a case, for example when the predetermined value is 150 W and the predetermined number of times is one, the power converter 30 determines at time 100 ms that the fluctuation range of the discharge power value of the storage cell 40 is a predetermined value or greater and, moreover, that the discharge power value repeatedly fluctuates. The power converter 31 determines at time 110 ms that the fluctuation range of the discharge power value of the storage cell 41 is a predetermined value or greater and, moreover, that the discharge power value repeatedly fluctuates. FIG. 5 is an example of an increase in output, but cases in which the output decreases are similar.

Figure 4:
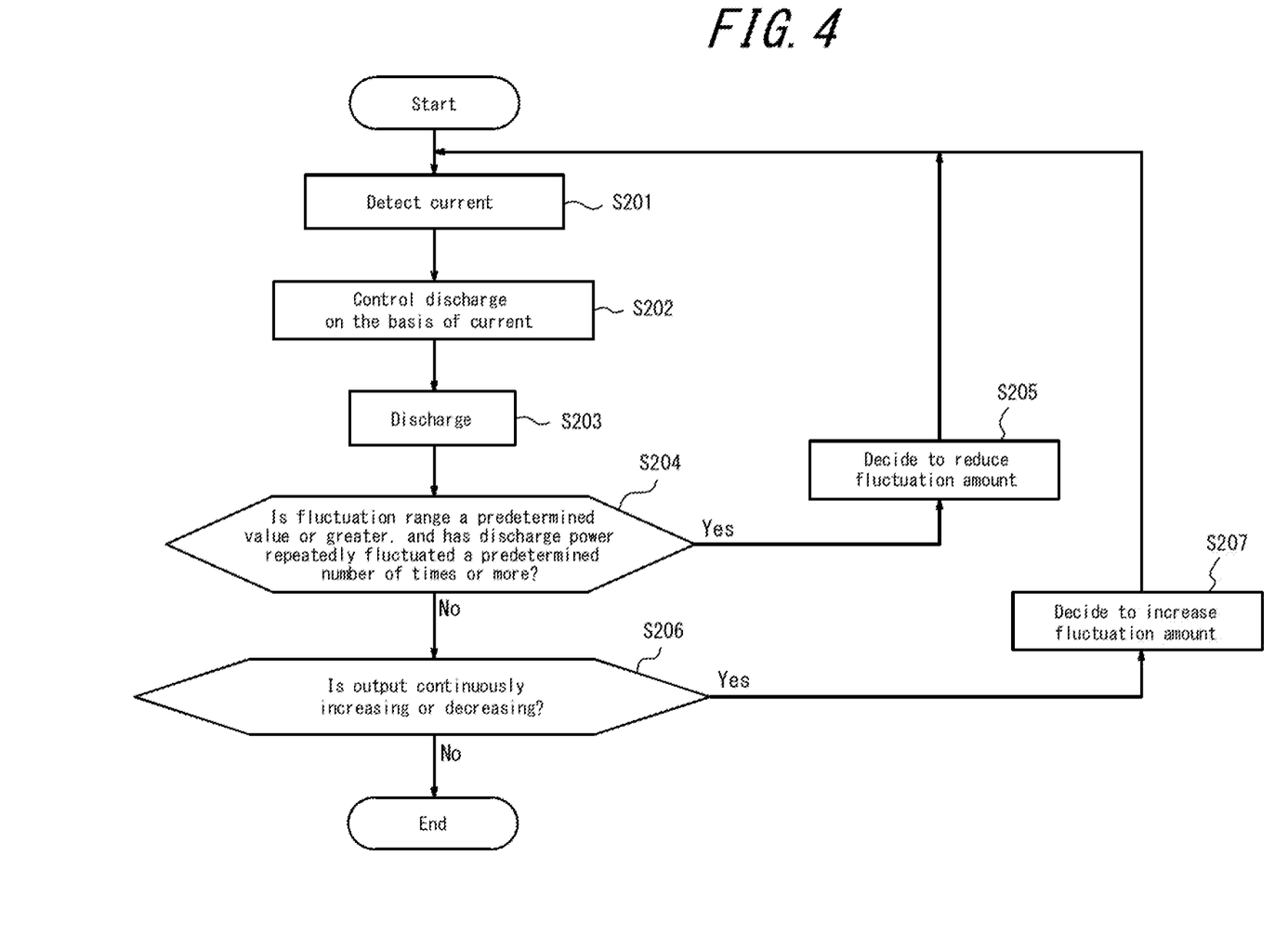
FIG. 4 is a flowchart illustrating an example of operations of an electricity storage system according to a second embodiment of the present disclosure.

The description now returns to the operations of the electricity storage system 1 in FIG. 4.

In the processing in step S205, the power converters 30, 31 decide to reduce the fluctuation amount of the discharge power, which is based on the value detected by the current sensors 10, 11, of the respective storage cells 40, 41. The power converters 30, 31 then each repeat the processing starting at step S201.

Figure 6:
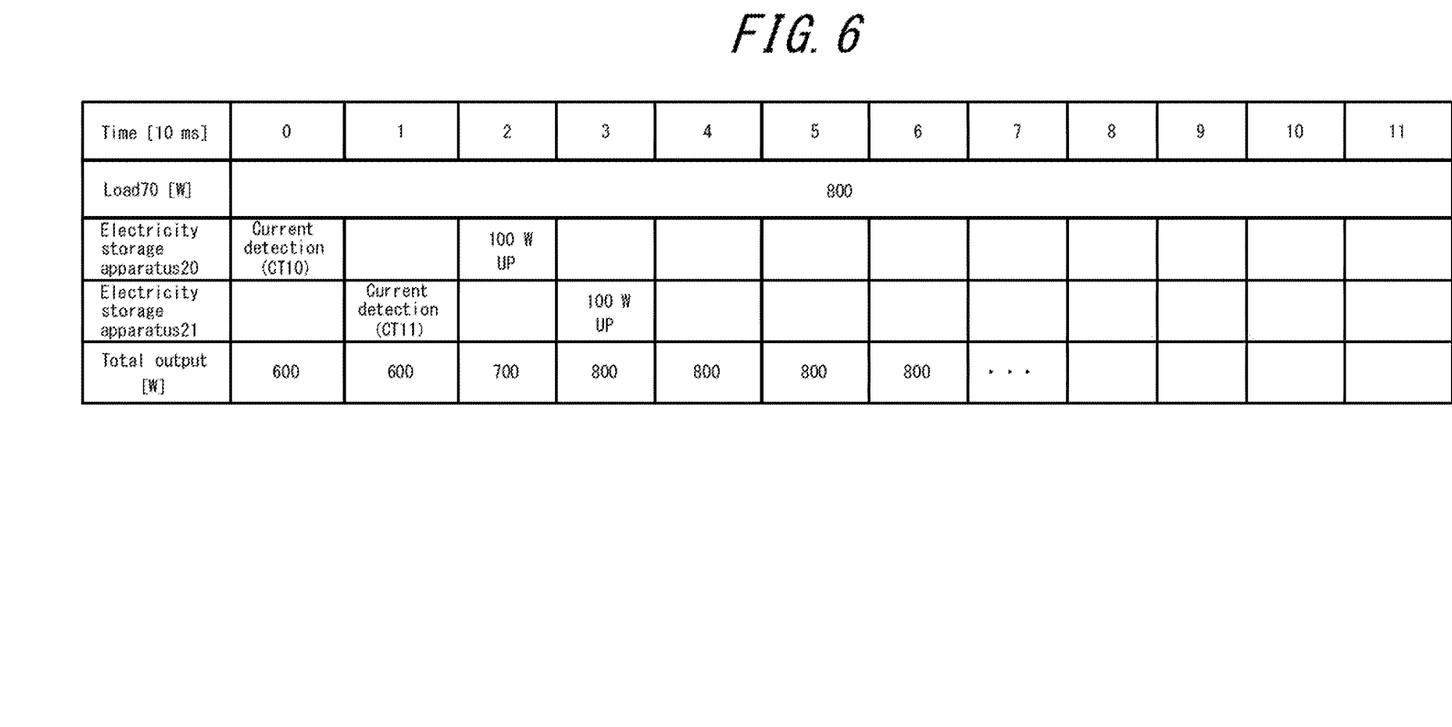
FIG. 6 illustrates an example of repeated discharge power control performed by electricity storage apparatuses.

FIG. 6 illustrates an example of discharge power control performed again by electricity storage apparatuses 20, 21. In the example of FIG. 6, the fluctuation amount of the discharge power from the storage cells 40, 41 is assumed to be reduced to half by the processing of step S206. For the sake of convenience, the initial time in FIG. 6 is described as being 0 ms.

At time 0 ms, the current sensor 10 transmits the detected value to the electricity storage apparatus 20. The power converter 30 then determines, on the basis of the value detected by the current sensor 10, that the output is 200 W short of the power consumption of the load 70 and decides to increase the discharge power value of the storage cell 40 by 100 W (which equals 200 W×(½)). At time 20 ms, the power converter 30 increases the discharge power value of the storage cell 40 by 100 W (which equals 200 W×(½)) and causes the storage cell 40 to discharge 400 W of power. As a result, the total output of the electricity storage apparatuses 20, 21 becomes 700 W.

At time 10 ms, the current sensor 11 transmits the detected value to the electricity storage apparatus 21. The power converter 31 then determines, on the basis of the value detected by the current sensor 11, that the output is 200 W short of the power consumption of the load 70 and decides to increase the discharge power value of the storage cell 41 by 100 W (which equals 200 W×(½)). At time 30 ms, the power converter 31 increases the discharge power value of the storage cell 41 by 100 W and causes the storage cell 41 to discharge 400 W of power. As a result, the total output of the electricity storage apparatuses 20, 21 becomes 800 W, which is equal to the 800 W power consumption of the load.

In this manner, even when the discharge power value per cycle of the storage cells 40, 41 is large relative to the power consumption of the load 70 and the output of the electricity storage system 1 repeatedly fluctuates, the discharge power value per cycle of the storage cells 40, 41 can be reduced with the processing in steps S201 to S206. This reduction in the present embodiment stabilizes the output of the electricity storage system 1 (the combined output of the electricity storage apparatuses 20, 21).

The description now returns to the operations of the electricity storage system 1 in FIG. 4.

In the processing in step S206, the power converters 30, 31 determine whether the output from the respective storage cells 40, 41 is continuously increasing or decreasing. IF the power converters 30, 31 determine that the output from the respective storage cells 40, 41 is continuously increasing or decreasing (step S206: Yes), the processing proceeds to step S207. IF the power converters 30, 31 determine that the output from the respective storage cells 40, 41 is not continuously increasing or decreasing (step S206: No), the power converters 30, 31 terminate the processing.

In the processing in step S207, the power converters 30, 31 decide to increase the fluctuation amount of the discharge power, which is based on the value detected by the current sensors 10, 11, of the respective storage cells 40, 41. The power converters 30, 31 then each repeat the processing starting at step S201.

In this manner, for example when an electricity storage apparatus malfunctions and the number of operable electricity storage apparatuses in the electricity storage system 1 reduces, the fluctuation amount of the discharge power from the storage cells 40, 41 can be increased by the processing of steps S206, S207. As a result, the output of the electricity storage system 1 (the combined output of the electricity storage apparatuses 20, 21) can be stabilized in the present embodiment.

In the processing in step S205, the power converters 30, 31 may output instantaneous pulses to each other at fixed intervals. Furthermore, the power converters 30, 31 may each measure the number of instantaneous pulses to obtain the total number, two, of the electricity storage apparatuses 20, 21 in the electricity storage system 1. On the basis of the total number, two, obtained in this way, the fluctuation amount may be reduced. For example, the power converters 30, 31 may each reduce the fluctuation amount to ½ when obtaining a total number of two electricity storage apparatuses 20, 21 in the electricity storage system 1 through the instantaneous pulse processing.

When the rated power outputs of the electricity storage apparatuses 20, 21 included in the electricity storage system 1 differ, the fluctuation amount may be decreased in the processing in step S205 in accordance with the ratio of the rated power outputs of the electricity storage apparatuses 20, 21.

As described above, the electricity storage apparatuses 20, 21 in the electricity storage system 1 according to the second embodiment can balance their respective degrees of degradation by increasing or decreasing the fluctuation amount of their output themselves, without use of other apparatuses or the like.

Furthermore, with the electricity storage system 1 according to the second embodiment, the degrees of degradation due to charging and discharging in the storage cells 40, 41 can be balanced by the electricity storage apparatuses 20, 21 themselves increasing or decreasing the fluctuation amount of their output. This improves the reliability of the electricity storage system 1 overall and enables a stable supply of power.

The electricity storage system 1 according to the second embodiment can also make the output of the electricity storage apparatuses 20, 21 equivalent even when, for example, the control timing differs between the electricity storage apparatuses 20, 21 due to a shift in the control cycle of the electricity storage apparatuses 20, 21 (see FIGS. 5 and 6).

Power source systems according to embodiments of the present disclosure are not limited to the aforementioned electricity storage system 1. A power source system according to an embodiment of the present disclosure may also be a fuel cell system. An example of a power source system according to an embodiment of the present disclosure being a fuel cell system is described below as an alternative embodiment.

Alternative Embodiment

Figure 7:
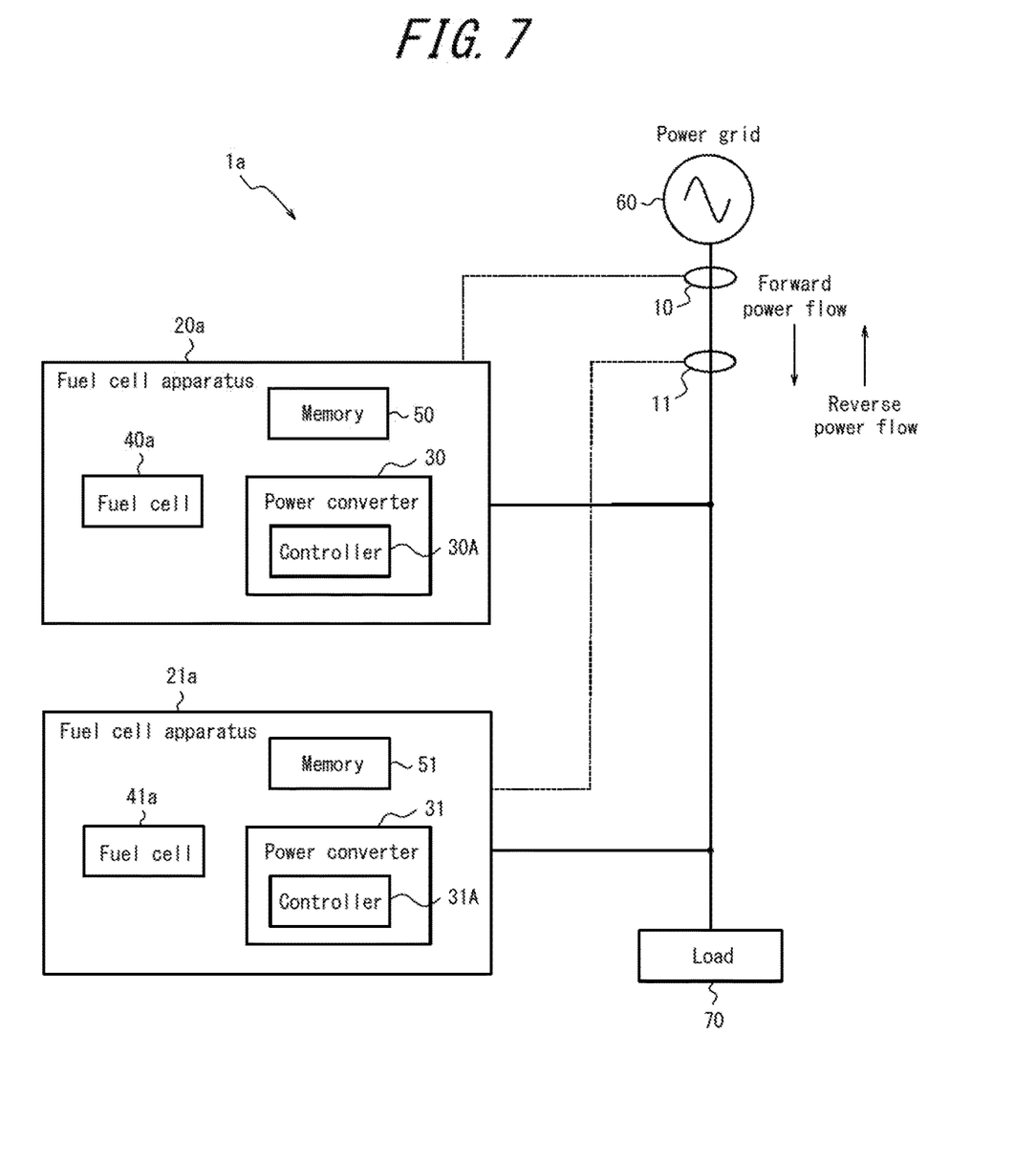
FIG. 7 illustrates an example of a fuel cell system according to an alternative embodiment of the present disclosure.

As illustrated in FIG. 7, a fuel cell system 1a includes current sensors 10, 11 and fuel cell apparatuses (power source apparatuses) 20a, 21a. The fuel cell system 1a in FIG. 7 includes two fuel cell apparatuses 20a, 21a, but the fuel cell system 1a may include three or more fuel cell apparatuses. The constituent elements in FIG. 7 that are the same as those in FIG. 1 are labeled with the same reference signs, and a description thereof is omitted.

The fuel cell storage apparatuses 20a, 21a, which are connected to a power grid 60, supply electric power to a load 70. The fuel cell apparatus 20a includes a power converter 30, a fuel cell 40a, and a memory 50. The fuel cell apparatus 21a includes a power converter 31, a fuel cell 41a, and a memory 51.

The fuel cells 40a, 41a generate electricity by an electrochemical reaction. Polymer electrolyte fuel cells (PEFCs), solid oxide fuel cells (SOFCs), or the like may, for example, be used as the fuel cells 40a, 41a.

The fuel cell system 1a illustrated in FIG. 7 can achieve the same control and effects as those of the electricity storage system 1 according to the first embodiment or the second embodiment. The present disclosure can also be applied to a power generator that performs a load following operation.

A case in which, depending on the contract between a consumer facility and an electric power provider, the power of an electricity storage apparatus, a fuel cell apparatus, or the like that is not using renewable energy is prohibited from flowing in reverse to the power grid (i.e. to the electric power provider) has been described above. However, the present embodiment can also be applied to cases in which power from an electricity storage apparatus, a fuel cell apparatus, and the like is allowed to flow in reverse to the power grid (i.e. to the electric power provider).

Although embodiments of the present disclosure have been described on the basis of drawings and examples, it is to be noted that various changes and modifications will be apparent to those skilled in the art based on the present disclosure. Therefore, such changes and modifications are to be understood as included within the scope of the present disclosure. For example, the functions and the like included in the various components and steps may be reordered in any logically consistent way. Furthermore, components or steps may be combined into one or divided.

The control of the present disclosure is described as a series of operations executed by a computer system and other hardware that can execute program instructions. Examples of the computer system and other hardware include a general-purpose computer, a personal computer (PC), a dedicated computer, a workstation, and other programmable data processing apparatuses. It should be noted that in each embodiment, various operations may be executed by a dedicated circuit (for example, individual logical gates interconnected in order to execute a particular function) implemented by program instructions (software). It should also be noted that various operations may be executed by a logical block, program module, or the like executed by one or more processors. The one or more processors that execute a logical block, program module, or the like encompass, for example, one or more of a microprocessor, a central processing unit (CPU), and a digital signal processor (DSP). The one or more processors also, for example, encompass an application specific integrated circuit (ASIC), a programmable logic device (PLD), and a field programmable gate array (FPGA). The one or more processors also, for example, encompass a controller, a microcontroller, an electronic device, another apparatus designed to be capable of executing the functions disclosed herein, and/or a combination of any of the above. The embodiments disclosed herein are, for example, implemented by hardware, software, firmware, middleware, microcode, or a combination of any of these.

The network used here may, unless indicated otherwise, be the Internet, an ad hoc network, a local area network (LAN), a cellular network, another network, or a combination of any of these.

The invention claimed is:

1. A power source apparatus comprising:
a power source configured to output electric power; and
a controller configured to:
   acquire a formula for evaluating the power source, the formula including an operation history of the power source,
   set an output condition of the power source on the basis of the formula and a response characteristic for load following; and
   cause the power source to supply electric power to the load by controlling the load following on the basis of the output condition depending on a value, detected by a detector, of forward power flow or reverse power flow to a power grid to which the power source is connected,
   wherein the controller is further configured to set the response characteristic for the load following by dividing an electric power value, determined from the value detected by the detector, by a total number of a plurality of power source apparatuses connected to the power grid.

2. The power source apparatus of claim 1, wherein the controller is further configured to
   determine whether the electric power output of the power source has repeatedly fluctuated a predetermined number of times or more; and
   decide to reduce the electric power output, which is based on the value detected by the detector, of the power source when the electric power output of the power source has repeatedly fluctuated the predetermined number of times or more, and
the response characteristic for the load following function is based on the reduced electric power output of the power source.

3. The power source apparatus of claim 2, wherein the controller is further configured to
   determine whether the electric power output of the power source has been continuously increasing or decreasing over two or more past control cycles; and
   decide to increase an amount by which the electric power output of the power source is adjusted in a next control cycle, based on the value detected by the detector, when it is determined that the electric power output of the power source has been continuously increasing or decreasing over the two or more past control cycles, and
the response characteristic for the load following in the next control cycle is based on the increased amount by which the electric power output of the power source is adjusted.

4. A power source system comprising:
at least one power source apparatus; and
a detector configured to detect forward power flow from a power grid and reverse power flow to the power grid;
wherein the at least one power source apparatus comprises:
   a power source configured to output electric power; and
   a controller configured to:
      acquire a formula for evaluating the power source based on an operation history of the power source apparatus,
      set an output condition of the power source apparatus on the basis of the formula and a response characteristic for load following; and
      cause the power source to supply electric power to the load by controlling the load following on the basis of the output condition depending on forward power flow or reverse power flow being detected by a detector,
   wherein the controller is further configured to set the response characteristic for the load following by dividing an electric power value, determined from the value detected by the detector, by a total number of a plurality of power source apparatuses connected to the power grid.

* * * * *